(12) United States Patent
Ishikawa et al.

(10) Patent No.: US 7,954,750 B2
(45) Date of Patent: *Jun. 7, 2011

(54) REEL AND RECORDING TAPE CARTRIDGE

(75) Inventors: Ren Ishikawa, Kanagawa (JP); Yosuke Sumiya, Kanagawa (JP); Shigeru Nishiyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 129 days.

This patent is subject to a terminal disclaimer.

(21) Appl. No.: 12/509,502

(22) Filed: Jul. 27, 2009

(65) Prior Publication Data
US 2010/0019077 A1    Jan. 28, 2010

(30) Foreign Application Priority Data

Jul. 28, 2008  (JP) ................................. 2008-193140

(51) Int. Cl.
*B65H 75/18*      (2006.01)
(52) U.S. Cl. .................. 242/611.1; 242/332.4; 242/348; 242/610.4
(58) Field of Classification Search .................. 242/348, 242/348.2, 332.4, 532.6, 609, 609.1, 610, 242/610.4, 611, 611.1, 608, 608.8; 360/132
See application file for complete search history.

(56) References Cited

U.S. PATENT DOCUMENTS

| | | | | |
|---|---|---|---|---|
| 3,322,373 | A * | 5/1967 | Boyer et al. | 242/118.7 |
| 6,491,247 | B2 * | 12/2002 | Huettenegger | 360/132 |
| 6,676,055 | B1 | 1/2004 | Martin | |
| 7,252,258 | B2 * | 8/2007 | Iino | 242/348 |
| 7,287,716 | B2 | 10/2007 | Asano | |
| 7,334,751 | B2 | 2/2008 | Suzuki | |
| 7,350,732 | B2 | 4/2008 | Sasaki et al. | |
| 7,497,397 | B2 | 3/2009 | Sasaki et al. | |
| 7,600,710 | B2 * | 10/2009 | Sumiya et al. | 242/611.1 |
| 2003/0226924 | A1 * | 12/2003 | Morita | 242/348 |

(Continued)

FOREIGN PATENT DOCUMENTS

JP         6-006355 U       1/1994

(Continued)

OTHER PUBLICATIONS

U.S. Appl. No. 12/693,465 filed on Jan. 26, 2010.

*Primary Examiner* — William A Rivera
(74) *Attorney, Agent, or Firm* — Solaris Intellectual Property Group, PLLC

(57) ABSTRACT

A reel comprising a hub formed in the shape of a cylindrical tube with a base, on an outer peripheral surface of which a recording tape is wound; a base side flange portion that projects-out to a radial direction outer side of a base portion side of the hub; a flange member configured in a disc shape or an annular plate shape of a material with an elastic modulus at least equal to a material that constitutes the hub, the flange member being coaxially joined to an opening end portion of the hub; a metal plate formed in a circular plate shape or an annular plate shape, which is fixed coaxially to the base portion of the hub; and plate retention portions that are formed integrally with the base portion of the hub and touch an outer peripheral surface of the metal plate at at least four locations, which are at equal intervals in a circumferential direction of the hub.

7 Claims, 13 Drawing Sheets

U.S. PATENT DOCUMENTS

| | | | |
|---|---|---|---|
| 2004/0124556 A1* | 7/2004 | Hawley | 264/136 |
| 2005/0205714 A1* | 9/2005 | Horita | 242/611 |
| 2006/0231660 A1 | 10/2006 | Yamamoto et al. | |
| 2009/0057463 A1 | 3/2009 | Sumiya et al. | |
| 2009/0218431 A1* | 9/2009 | Mori | 242/348 |

FOREIGN PATENT DOCUMENTS

| | | |
|---|---|---|
| JP | 2000-048526 A | 2/2000 |
| JP | 2003-007030 A | 1/2003 |
| JP | 2005-339634 | * 12/2005 |

* cited by examiner

REEL AND RECORDING TAPE CARTRIDGE

CROSS-REFERENCE TO RELATED APPLICATIONS

This application claims priority under 35 USC 119 from Japanese Patent Application No. 2008-193140 filed on Jul. 28, 2008, the disclosure of which is incorporated by reference herein.

BACKGROUND OF THE INVENTION

1. Technical Field

The present invention relates to a reel on which a recording tape, such as a magnetic tape or the like, is wound, and to a recording tape cartridge that accommodates, within a case, a reel on which a magnetic tape is wound.

2. Related Art

As described in Japanese Patent Application Laid-Open (JP-A) No. 2003-7030, a reel for a recording medium tape cartridge is known in which a circular disc-shaped flange is welded to an end portion of a tubular hub around whose outer peripheral surface a tape is wound, and the flange is formed of a resin material with an elastic modulus equal to or greater than a resin material of the hub. With this reel, deformation of the reel in response to a tape winding load may be suppressed. Further, as described in Japanese Utility Model Application Laid-Open (JP-U) No. 6-6355, a reel is known in which, in a tape reel formed of a hub and a flange, the flange is formed of a carbon fiber-reinforced plastic. This reel, with a structure that employs metal in the hub to withstand winding pressure of the tape, enables a reduction in weight of the reel as a whole.

SUMMARY OF THE INVENTION

However, it is desired not only that reel deformation due to winding pressure of a tape is suppressed, but also that a shape after deformation is an excellent shape.

In view of the aforementioned, the present invention relates to a reel in which the outer peripheral surface of a hub forms a proper shape in a state in which a recording tape is wound, and to a recording tape cartridge.

A reel of a first aspect of the present invention includes: a hub formed in the shape of a cylindrical tube with a base, on an outer peripheral surface of which a recording tape is wound; a base side flange portion that projects-out to a radial direction outer side of a base portion side of the hub; a flange member configured in a disc shape or an annular plate shape of a material with an elastic modulus at least equal to a material that constitutes the hub, the flange member being coaxially joined to an opening end portion of the hub; a metal plate formed in a circular plate shape or an annular plate shape, which is fixed coaxially to the base portion of the hub; and plate retention portions that are formed integrally with the base portion of the hub and touch an outer peripheral surface of the metal plate at at least four locations, which are at equal intervals in a circumferential direction of the hub.

In the reel described above, because the flange member that is formed of the material whose elastic modulus is at least equal to the hub material is joined to the opening end portion of the hub, the opening end portion, at which stiffness of the hub body is lower than at the base portion side, is reinforced by the flange member. Therefore, deformation of the hub in association with winding of a tape onto the outer peripheral surface of the hub is suppressed. In addition, in the present reel, because the plate retention portions joined to the outer peripheral surface of the metal plate at the hub base portion are formed integrally with the hub base portion, strength of retention of the metal plate is higher.

Further, in the present reel, the aforementioned plate retention portions are provided at at least four locations along the hub circumferential direction, that is, a shape is formed in which the peripheral surface of the metal plate is exposed (in incision shapes, recess shapes, groove shapes or the like) between the plate retention portions that are adjacent in the circumferential direction. Therefore, in comparison with a structure in which, for example, a plate retention portion is provided along the whole periphery of the metal plate, deformation in radial directions is expedited at the base portion side of the hub, at which the stiffness is relatively high. That is, incision shapes between the plate retention portions that are adjacent in the circumferential direction act as deformation expediting portions between the plate retention portions. Therefore, at the hub of the present reel, a difference between the base portion side and the opening portion side in radial direction deformation amounts due to tape winding pressure is small. Moreover, because the plate retention portions are provided at at least four locations in the hub circumferential direction, the shape of the hub after tape winding when viewed in the axial direction is a shape close to a perfect circle. Therefore, with the present reel, the hub shape after tape winding is excellent.

Thus, with the reel of the first aspect, the outer peripheral surface of the hub forms a proper shape in the state in which the recording tape is wound thereon. It is preferable, with regard to expediting deformation at the hub base portion side, if the circumferential direction lengths of the incision shapes (deformation expediting shapes) between the plate retention portions that neighbor in the hub circumferential direction are formed so as to be sufficiently long relative to the circumferential direction lengths of the plate retention portions themselves.

A reel of a second aspect of the present invention is the reel of the first aspect in which the material that constitutes the hub includes a thermoplastic resin, and the material that constitutes the flange member includes a thermoplastic resin, and a linear expansion coefficient of the material is equal to or less than a linear expansion coefficient of the material that constitutes the hub.

In the reel of the second aspect, because the linear expansion coefficient of the thermoplastic resin constituting the flange member is equal to or less than the linear expansion coefficient of the thermoplastic resin constituting the hub, deformation of the hub due to deformation of the flange member in accordance with temperature is suppressed. Moreover, under high-temperature conditions, deformation (inclining toward the axis) of the opening side end of the hub by the flange member is limited, and deformation of the hub opening end side is effectively suppressed.

A reel of a third aspect of the present invention is the reel of the first or second aspect in which the material that constitutes the hub includes reinforcing fibers in a thermoplastic resin, and the material that constitutes the flange member is a thermoplastic resin of the similar type as the thermoplastic resin that constitutes the hub, and the material includes reinforcing fibers in a proportion equal to or more than the material that constitutes the hub.

In the reel of the third aspect, the elastic modulus and linear expansion coefficient of the material constituting the flange member and the material constituting the hub may be specified (regulated) by inclusion ratios of the reinforcing fibers in the similar type of thermoplastic resin. Further, characteristics of joining of the flange member to the hub are excellent.

A reel of a fourth aspect of the present invention is a reel of the first to third aspects in which the flange member is formed by injection molding, and gate marks for injecting resin into a die are disposed at an inner edge side of the flange member and face in the axial direction.

In the reel of the fourth aspect, when the flange member is being formed by injection molding, the resin is injected into the die through gates oriented in the axial direction, which forms a substantial right angle with respect to a surface of the flange. Therefore, a cross-sectional area of the gates may be set larger, and flow characteristics of a material including a thermosetting resin that hardens to a high elastic modulus are excellent. Therefore, for example, a fiber-reinforced resin including reinforcing fibers in a thermoplastic resin can excellently flow into the die, and a flange member with a high elastic modulus may be obtained with ease.

A reel of a fifth aspect of the present invention is the reel of the third aspect in which the reinforcing fibers are included in the thermoplastic resin that constitutes the flange member in a proportion greater than the material that constitutes the hub.

In the reel of the fifth aspect, the elastic modulus and linear expansion coefficient of the flange member relative to the hub may be regulated by the inclusion proportion of the reinforcing fibers in the thermoplastic resin constituting the flange member more than in the similar type of thermoplastic resin constituting the hub. Therefore, deformation of the hub opening end side is effectively suppressed.

A recording tape cartridge of a sixth aspect of the present invention is a recording tape cartridge including: the reel of any of the first to fifth aspects; and a case that rotatably accommodates the reel.

In the recording tape cartridge of the sixth aspect of the present invention, because the hub around which the recording tape is wound forms a proper shape, curving of the recording tape in the transverse direction is suppressed. Traveling of the recording tape is thereby stable.

As described above, the reel and recording tape cartridge relating to the present invention have the excellent effect that an outer peripheral surface of a hub forms a proper shape in a state in which a recording tape is wound.

BRIEF DESCRIPTION OF THE DRAWINGS

Embodiments of the present invention will be described in detail based on the following figures, wherein.

DETAILED DESCRIPTION OF THE INVENTION

Figure 1:
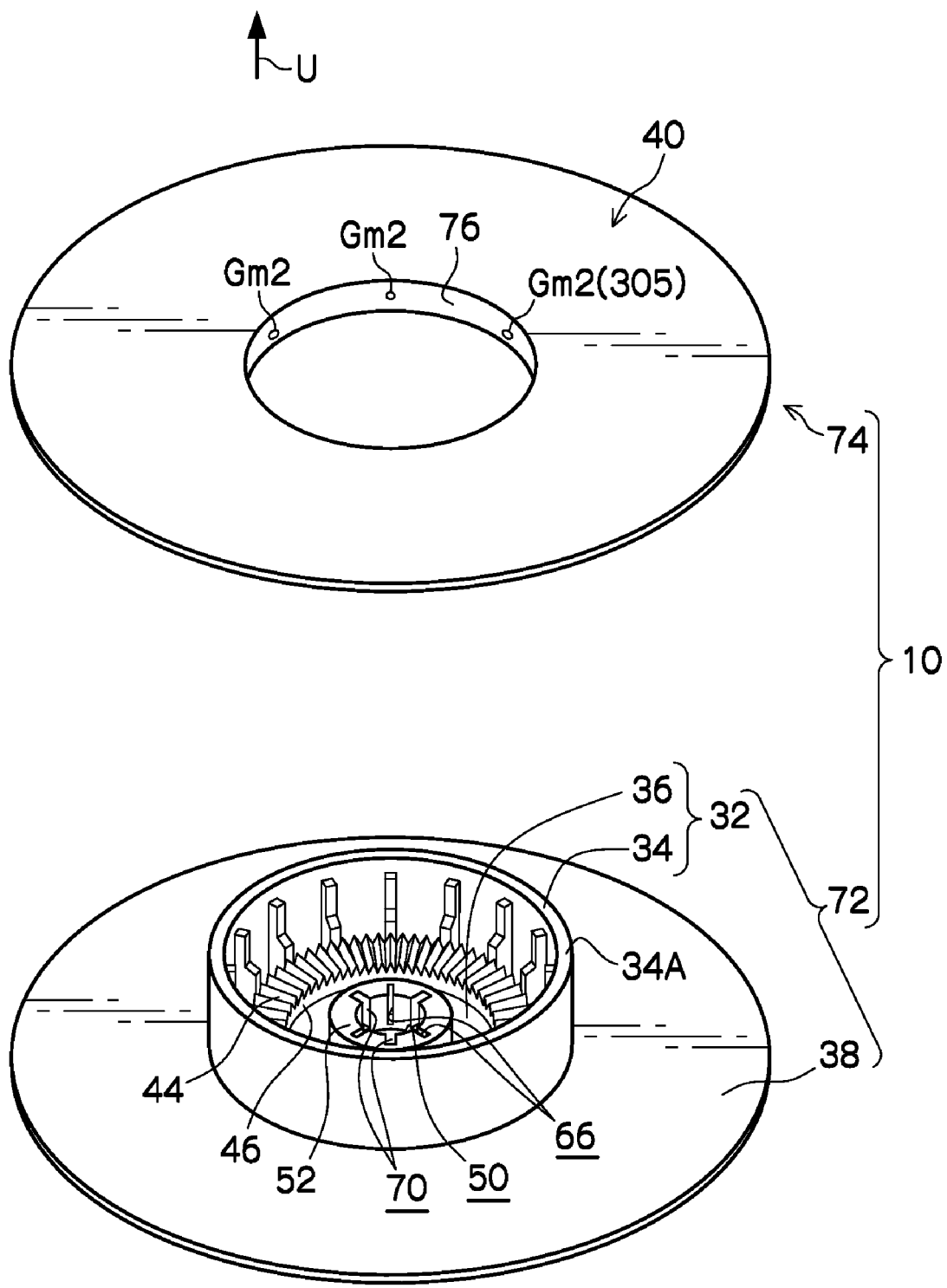
FIG. 1 is an exploded perspective view of a reel relating to a first exemplary embodiment of the present invention.

A reel 10 relating to a first exemplary embodiment of the present invention, and a recording tape cartridge 11 that is configured so as to include the reel 10, will be described on the basis of FIG. 1 through FIG. 10. First, the schematic overall structure of the recording tape cartridge 11 including the reel 10 will be described, and then the characteristic structure of the reel 10 will be described. Note that, for convenience of explanation, the direction of loading the recording tape cartridge 11 into a drive device is denoted by arrow A, and this direction of arrow A is the front direction (front side) of the recording tape cartridge 11. Further, the direction denoted by arrow U is the upward direction (upper side) of the recording tape cartridge 11.

(Schematic Overall Structure of Recording Tape Cartridge)

As shown in FIG. 7 through FIG. 9B, the recording tape cartridge 11 relating to the present exemplary embodiment has a case 12. The case 12 is configured by an upper case 14 and a lower case 16 being joined together. Specifically, the upper case 14 is configured such that a substantially frame-shaped peripheral wall 14B stands erect along the outer edge of a ceiling plate 14A which is substantially rectangular in plan view. The lower case 16 is configured such that a peripheral wall 16B stands erect along the outer edge of a floor plate 16A which has a configuration substantially corresponding to that of the ceiling plate 14A. The case 12 is formed substantially in the shape of a box by the upper case 14 and the lower case 16 being joined together by ultrasonic welding or screws or the like in a state in which the open end of the peripheral wall 14B and the open end of the peripheral wall 16B abut one another.

At a corner portion of the case 12 at the leading side in the direction of loading the recording tape cartridge 11 into a drive device, the ceiling plate 14A, the peripheral wall 14B, the floor plate 16A, and the peripheral wall 16B are respectively cut-out such that an opening 18, which is inclined with respect to the direction of loading, is formed. Further, a circular gear opening 20 which passes through the floor plate 16A is provided in the substantially central portion of the floor plate 16A, and is for exposing a reel gear 42 which will be described later. At the edge portion of the gear opening 20 at the floor plate 16A, an annular rib 22 projects toward the interior of the case 12, and is for positioning and dust-proofing the reel 10 which will be described later.

Figure 7:
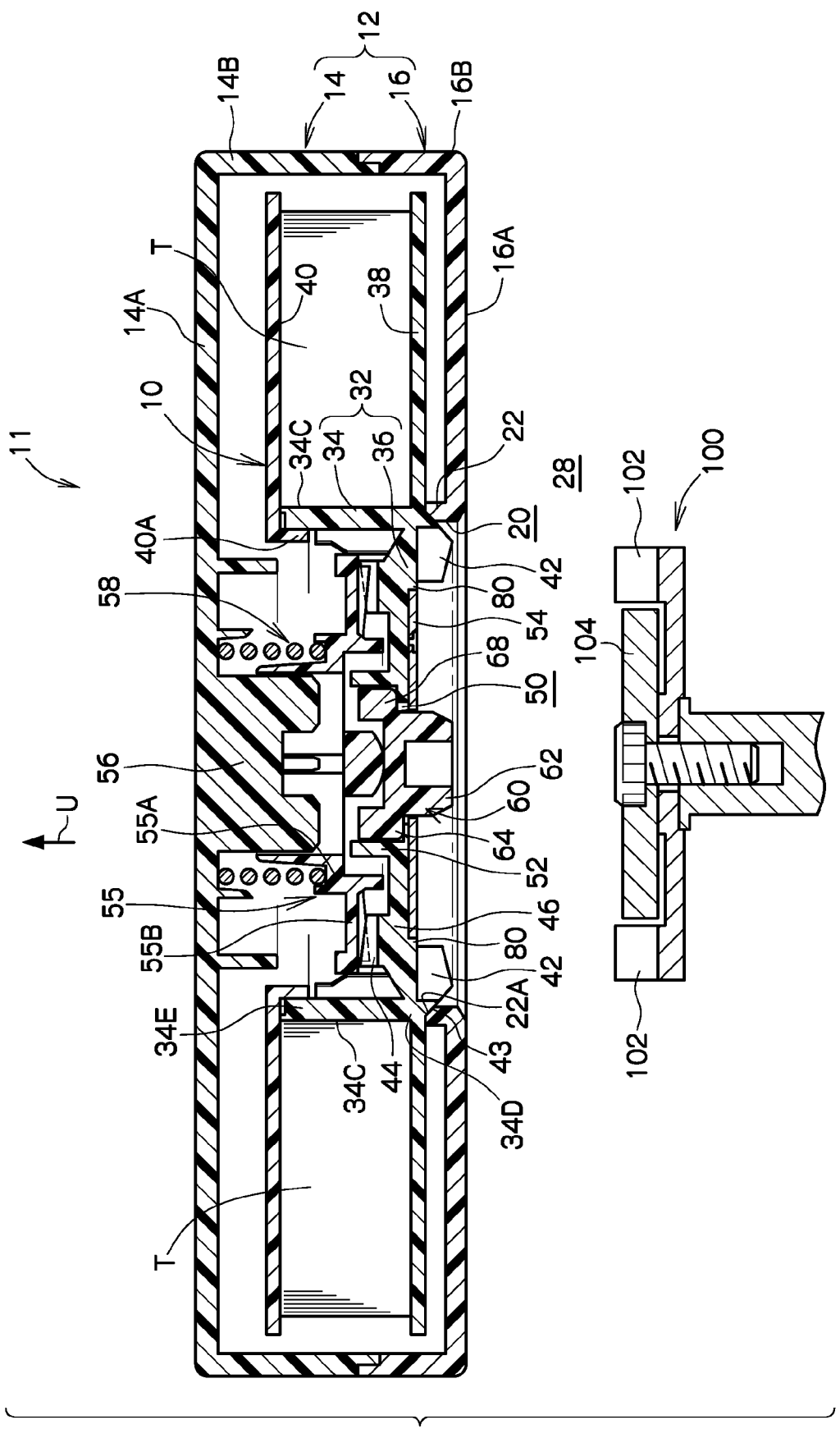
FIG. 7 is a sectional view of a recording tape cartridge relating to the first exemplary embodiment of the present invention at a time of non-use.

As shown in FIG. 7, only one of the reel 10 is rotatably accommodated within the case 12. A magnetic tape T serving as a recording tape is wound on the reel 10, and a leader block 30 serving as a leader member is attached to the distal end of the magnetic tape T. When the recording tape cartridge 11 is not in use, the leader block 30 is accommodated and held at the inner side of the opening 18 of the case 12. Further, in this state, the leader block 30 closes-off the opening 18 and impedes entry of dust and the like into the case 12.

When the magnetic tape T is pulled-out within a drive device, the leader block 30 is taken-out from the case 12 by a pull-out means of the drive device and is guided to a take-up reel (not shown) of the drive device. Note that, instead of a leader block, a leader pin shaped as a small shaft, or a tape-shaped leader tape may be employed as the leader member. In this case, for example, a door member for opening and closing the opening 18 is provided at the case 12. Further, the opening 18 may be formed along the peripheral walls 14B, 16B (by cutting out only the peripheral walls 14B, 16B).

Figure 2:
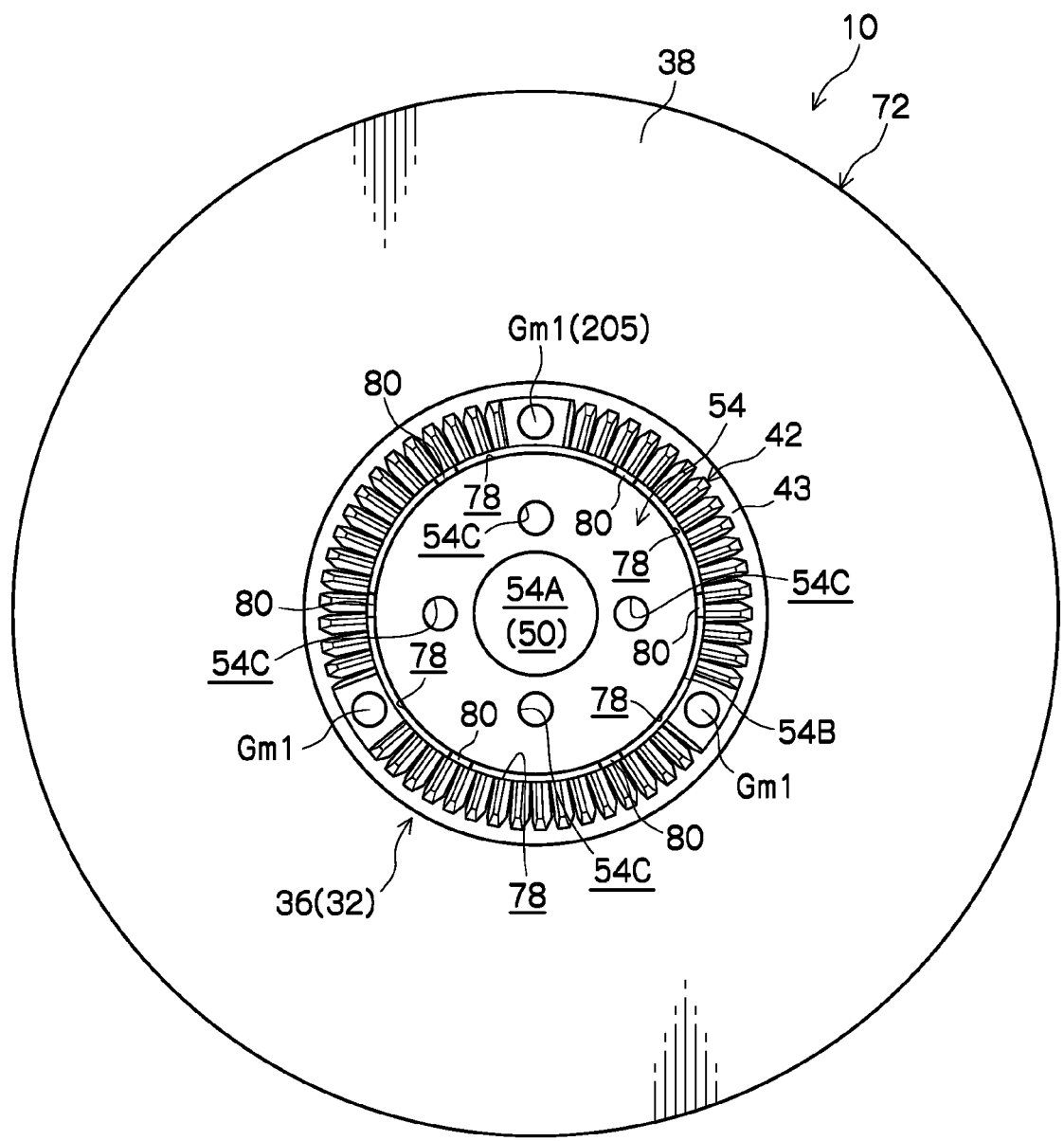
FIG. 2 is a bottom view of the reel relating to the first exemplary embodiment of the present invention.
Figure 3:
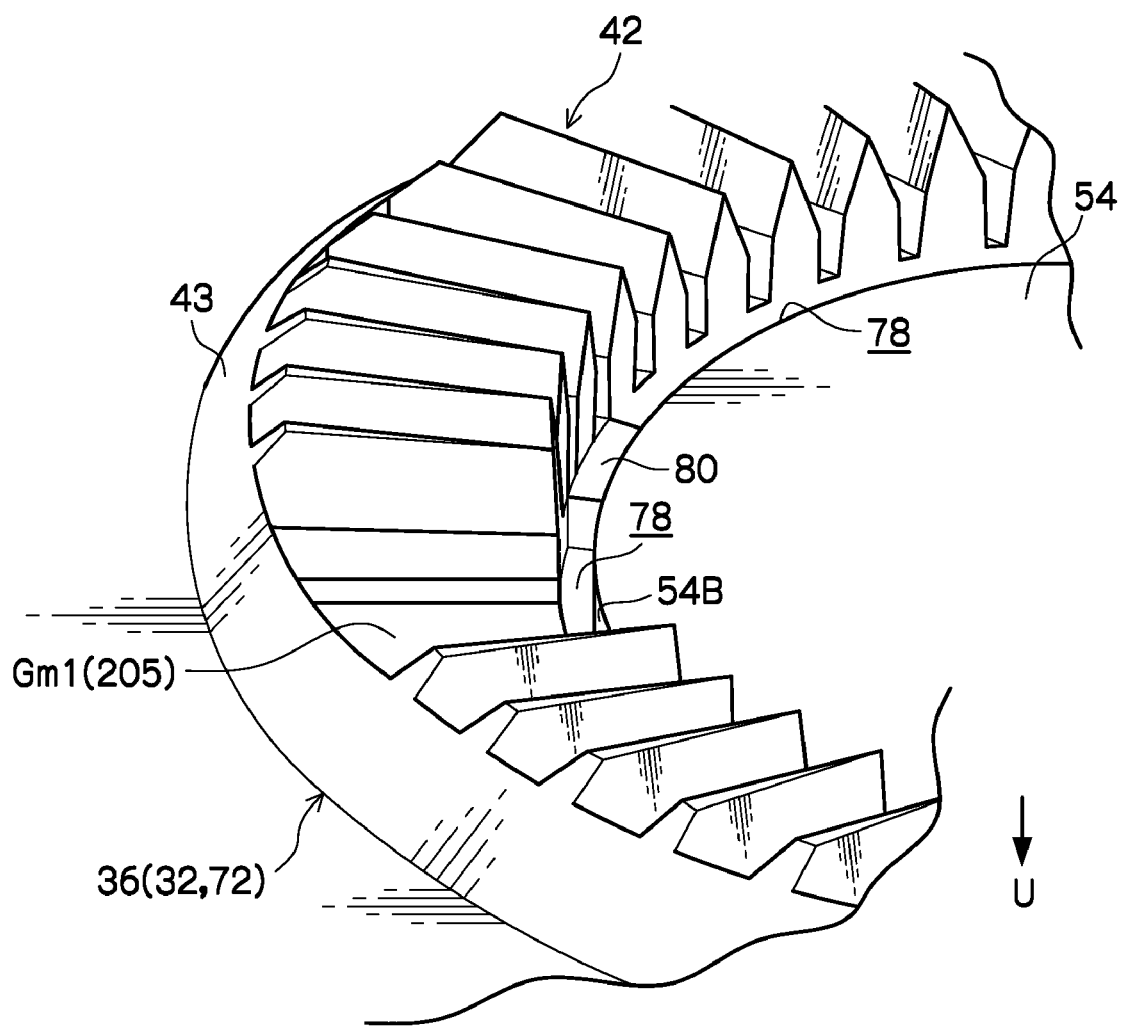
FIG. 3 is a perspective view showing, enlarged, a plate retention portion of the reel relating to the first exemplary embodiment of the present invention.

As shown in FIG. 1 through FIG. 3, the reel 10 has a reel hub 32 that structures the axially central portion of the reel 10. The reel hub 32 is substantially formed in the shape of a cylindrical tube having a base, and includes a cylindrical tube portion 34 on whose outer peripheral surface the magnetic tape T is wound, and a base portion 36 that closes-off the bottom portion of the cylindrical tube portion 34. Further, a lower flange 38, which projects-out toward the radial direction outer side of the reel hub 32, is provided in a vicinity of the base portion 36 side end portion (the lower end portion) of the reel hub 32. On the other hand, an upper flange 40, which projects-out toward the radial direction outer side of the reel hub 32, is provided from the upper end portion of the cylindrical tube portion 34. The magnetic tape T is wound at the outer peripheral surface of the cylindrical tube portion 34 of the reel hub 32, between the opposing surfaces of the lower flange 38 and the upper flange 40.

The annular reel gear 42, which is formed coaxially with the reel 10, projects from a vicinity of the outer periphery at the bottom surface (outer surface) of the base portion 36 of the reel hub 32. The reel gear 42 can mesh with a driving gear 102 that is provided at the distal end of a rotating shaft 100 of a drive device. On the other hand, as shown in FIG. 1 through FIG. 3, an annular engaging gear 44 that is formed coaxially with the reel 10 is provided in a vicinity of the outer periphery at the top surface (inner surface) of the base portion 36 of the reel hub 32. The engaging gear 44 is formed on an annular pedestal portion 46 that protrudes slightly from the inner surface of the base portion 36. The engaging gear 44 can mesh with a braking gear portion 55B of a braking member 55 that will be described later A pass-through hole 50 is provided at the axially central portion of the base portion 36 of the reel hub 32. A boss portion 52 for a clutch stands erect from the top surface of the base portion 36 along the edge portion of the pass-through hole 50. This boss portion 52 for a clutch will be described together with a clutch member 60 that will be described later.

Although details thereof will be described later, the main portion of the reel 10 is formed by resin molding. The reel has an annular reel plate 54 that is fixed at the inner side of the reel gear 42 at the bottom surface (obverse) of the base portion 36 of the reel hub 32. The reel plate 54 is formed in an annular shape of a magnetic material, and is fixed coaxially to the base portion 36 of the reel hub 32. The annular reel plate 54 is fixed to the base portion 36 of the reel hub 32 by, for example, insert molding or welding. The reel plate 54 is for attraction and holding by a magnet 104 of the rotating shaft 100 of the drive device.

The above-described reel 10 is accommodated in the case 12, and is disposed on the annular rib 22 when the reel 10 is not in use. Specifically, radial direction displacement of the reel 10 is restricted due to the outer side portion of a taper portion 43 that is continuous with the radial direction outer side of the reel gear 42 at the base portion 36 (i.e., a vicinity of the inner edge of the lower flange 38) abutting the top end surface of the annular rib 22, and the inner edge portion of the top end of the annular rib 22 being a taper surface 22A that corresponds to the taper portion 43.

Figure 9A:
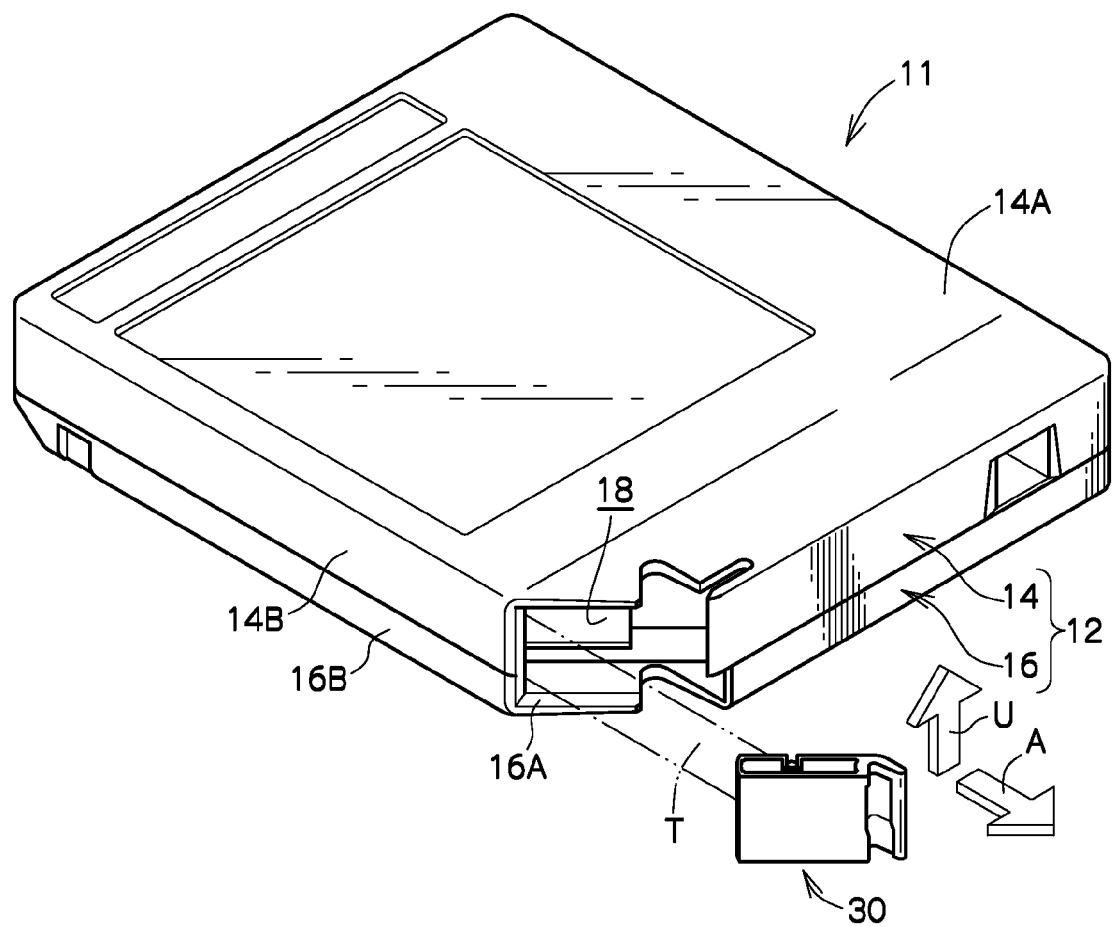
FIG. 9A is a view showing the recording tape cartridge relating to the first exemplary embodiment of the present invention, which is a perspective view viewed from above.
Figure 9B:
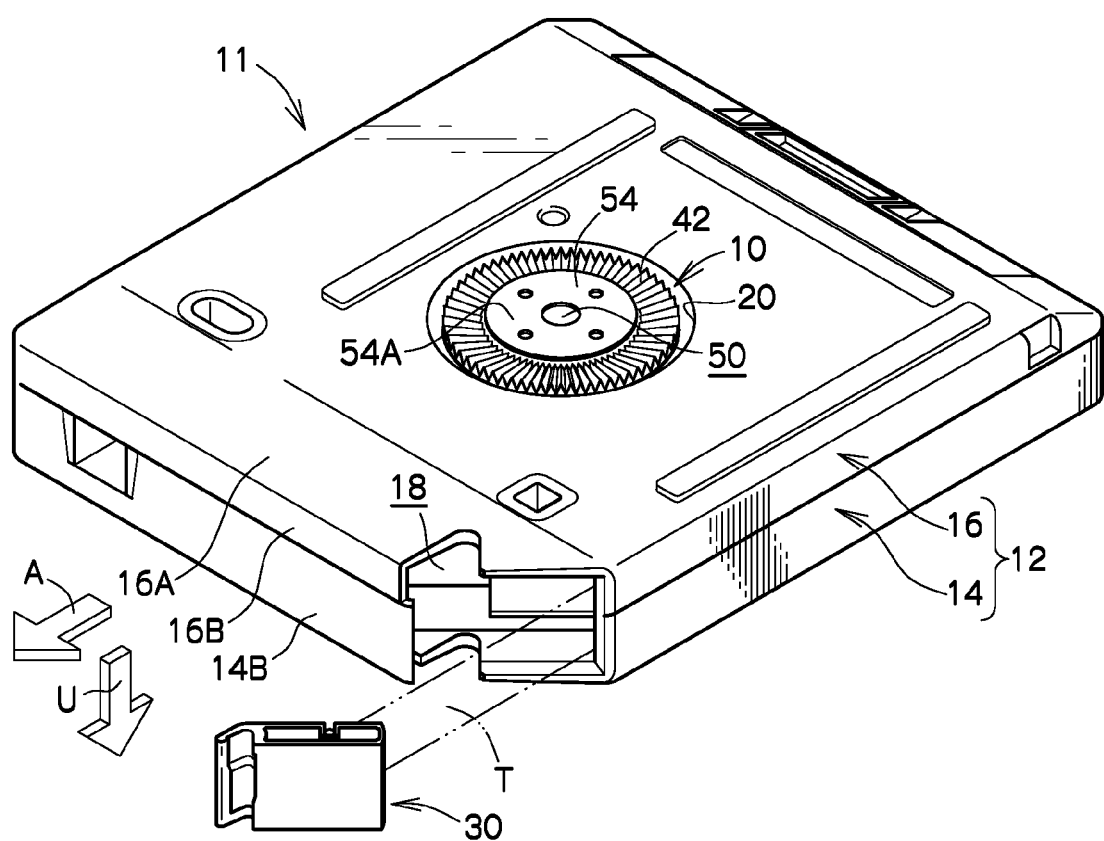
FIG. 9B is a view showing the recording tape cartridge relating to the first exemplary embodiment of the present invention, which is a perspective view viewed from below.

In this state, the reel 10 on the whole is positioned within the case 12, and the reel gear 42 and the reel plate 54 are exposed from the gear opening 20 (see FIG. 9B). Namely, the reel gear 42 does not project-out from the outer surface (bottom surface) of the floor plate 16A, and looks out on the exterior of the case 12 from the gear opening 20. Further, the pass-through hole 50 looks out on the gear opening 20 through a through-hole 54A that is formed in the axial center of the reel plate 54. In this way, operation of the reel 10, i.e., chucking (holding) and driving/rotating, are possible from the exterior of the case 12.

Figure 10:
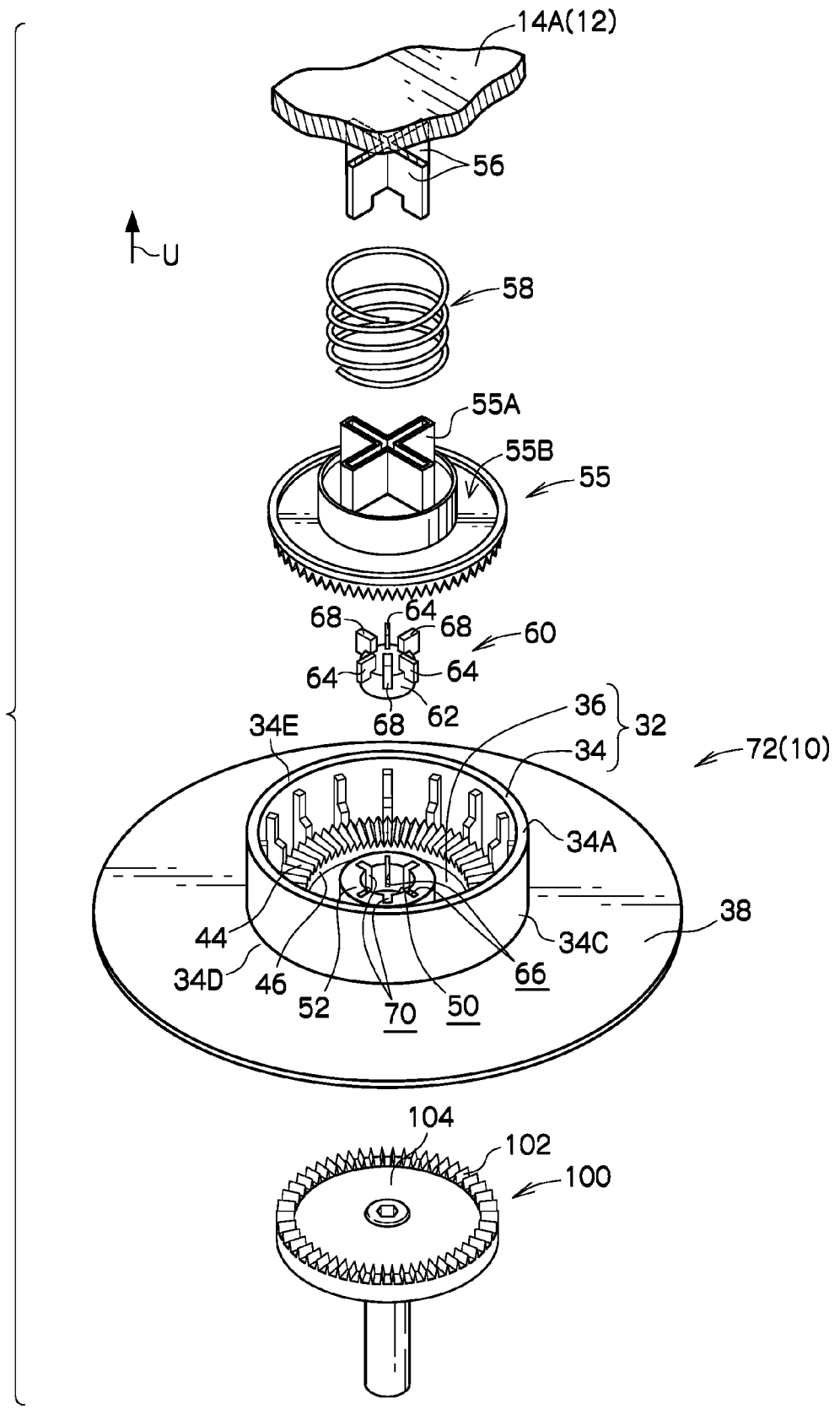
FIG. 10 is an exploded perspective view of a reel-lock structure of the recording tape cartridge relating to the first exemplary embodiment of the present invention.

Further, as shown in FIG. 2, FIG. 7 and FIG. 10, the recording tape cartridge 11 has the braking member 55 which is for impeding rotation of the reel 10 at times when the recording tape cartridge 11 is not in use. The braking member 55 is configured with a rotation restricting portion 55A and the braking gear portion 55B as the main portions thereof. The rotation restricting portion 55A is inserted into a cross-shaped rib 56 that is formed to project from the ceiling plate 14A of the case 12, such that relative rotation with respect to the case 12 is restricted. The braking gear portion 55B extends outwardly in the radial direction from the lower end of the rotation restricting portion 55A, and can engage with the engaging gear 44 of the reel 10.

The braking member 55 is configured so as to, by being displaced within the case 12 in the axial direction of the reel 10 when not in use, be able to selectively assume a braking position at which the braking gear portion 55B meshes with the engaging gear 44, and a rotation permitting position at which meshing of the braking gear portion 55B and the engaging gear 44 is cancelled. A compression coil spring 58 is disposed in a compressed state between the braking member 55 and the ceiling plate 14A of the case 12. The braking member 55 is offset toward the braking position due to the urging force of the compression coil spring 58.

Further, the recording tape cartridge 11 has a clutch member 60 that is operated from the exterior at the time of canceling the locked state of the reel 10 by the braking member 55. When the driving gear 102 of the rotating shaft 100 of the drive device meshes with the reel gear 42, the clutch member 60 is pushed by the rotating shaft 100 and displaces the braking member 55 upwardly, i.e., toward the rotation permitting position.

Specifically, the clutch member 60 is disposed between the braking member 55 and the base portion 36 of the reel 10, and has a clutch main body 62 that passes-through the base portion 36. Further, plural guide ribs 64 and plural stopper ribs 68 extend outwardly in the radial direction from the clutch main body 62. Due to the guide ribs 64 being disposed in rotation restricting grooves 66 which are formed in the boss portion 52 for a clutch of the reel 10, the guide ribs 64 exhibit the function of restricting relative rotation of the clutch member 60 with respect to the reel 10, and the function of guiding the clutch member 60 in the axial direction of the reel 10. Due to the stopper ribs 68 abutting stopper surfaces 70A of stopper grooves 70 which are formed in the boss portion 52 for a clutch, the stopper ribs 68 exhibit the function of positioning the clutch member 60 with respect to the reel 10 in the axial direction (including a function of preventing the clutch member 60 from coming out).

Figure 8:
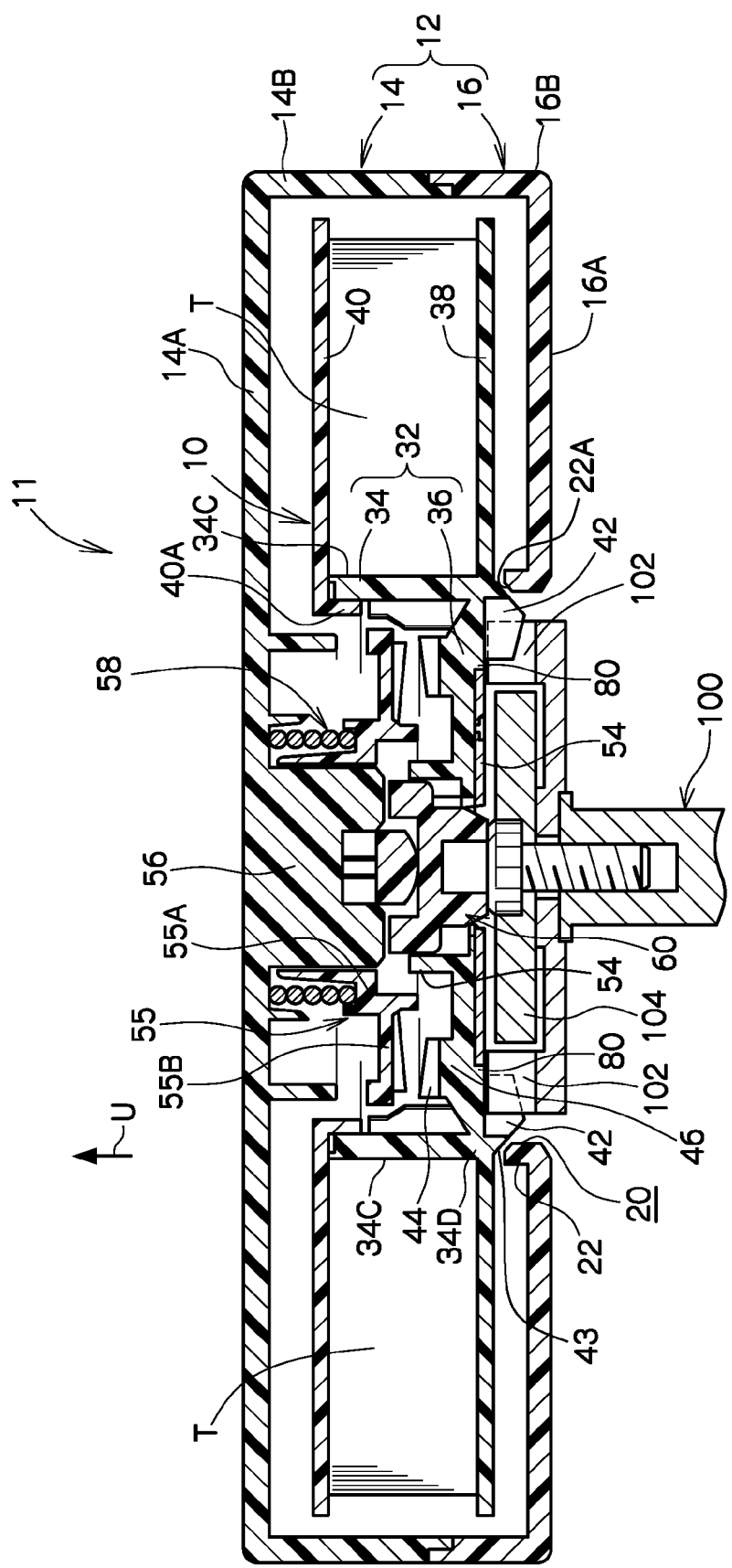
FIG. 8 is a sectional view of a recording tape cartridge relating to the first exemplary embodiment of the present invention at a time of use.

As described above, the braking member 55 is configured such that, when the recording tape cartridge 11 is not in use, as shown in FIG. 7, the braking gear portion 55B meshes with the reel gear 42 due to the urging force of the compression coil spring 58, and rotation of the reel 10 with respect to the case 12 is prevented. On the other hand, as shown in FIG. 8, when the reel gear 42 of the reel 10 meshes with the driving gear 102 of the rotating shaft 100 of the drive device, rotation of the reel 10 with respect to the case 12 is permitted due to the clutch member 60, which is pushed by the rotating shaft 100, displacing the braking member 55 to the rotation permitting position.

(Detailed Structure of Reel)

As shown in FIG. 1, the reel 10 relating to this exemplary embodiment has a two-piece structure, of a hub member with lower flange 72, in which the reel 32 and the lower flange 38 are integrally formed, and an upper flange member 74, whose principal structural element is the upper flange 40. The reel hub 32 and lower flange 38 of the hub member with lower flange 72 are integrally formed by injection molding of a resin. Further, this exemplary embodiment has a structure in which the reel plate 54 made of metal is insert-molded.

The upper flange member 74 is configured with an annular rib 76, which fits into the inner periphery of the cylindrical tube portion 34 of the reel hub 32, projecting-out from an inner edge portion of the upper flange 40, which forms an annular shape. The upper flange member 74 is a structure of which, in a state in which the annular rib 76 is fitted into the cylindrical tube portion 34 of the reel hub 32, an annular rib 76 radial direction outer side portion (a portion between the upper flange 40 and the annular rib 76) is fixed to an upper end surface 34A of the cylindrical tube portion 34 by ultrasonic welding or the like.

As shown in FIG. 2, groove portions 78, at which an outer peripheral surface 54B (thick portion) of the reel plate 54 is exposed, are formed in the base portion 36 of the reel hub 32 (the hub member with lower flange 72) between the reel plate 54 and the reel gear 42. The groove portions 78 are plurally formed (six in this exemplary embodiment) at equal intervals in the circumferential direction of the reel hub 32. These groove portions 78 are formed as marks of portions of retention (positioning portions) of a die for the reel plate 54 when the reel plate 54 is being insert-molded into the hub member with lower flange 72.

In the reel 10, plate retention portions (grooveless portions) 80 are formed between the six groove portions 78. As shown in FIG. 3, the plate retention portions 80 touch against the outer peripheral surface 54B of the reel plate 54 while covering the outer peripheral surface 54B from the radial direction outer side. Thus, as shown in FIG. 2, in this exemplary embodiment six of the plate retention portions 80 are disposed at equal intervals in the circumferential direction at the periphery of the reel plate 54.

Now, in this exemplary embodiment, a groove width of the groove portions 78 (a radial direction gap between the reel plate 54 and the reel gear 42) is approximately 0.6 mm and the groove depth is approximately 0.8 mm. Further, in this exemplary embodiment, the diameter of the reel plate 54 is approximately 30 mm (the circumference of the reel plate 54 is approximately 94 mm) and the circumferential direction length of each plate retention portion 80 is approximately 2.5 mm. Thus, it is apparent that the circumferential direction lengths of the plate retention portions 80 are much shorter than the circumferential direction lengths of the groove portions 78 (approximately 13.2 mm).

The above-described hub member with lower flange 72 (the reel hub 32) is formed by injection molding of a fiber-reinforced plastic in which approximately 10% by weight of glass fibers, which serve as reinforcing fibers, is mixed into a polycarbonate which serves as a thermoplastic resin. The fiber-reinforced plastic with approximately 10% by weight of glass fibers mixed in has a bending elastic modulus of approximately 3400 MPa and a linear expansion coefficient of approximately 5 to 6 ($10^{-5}$/K) (approximately 5 ($10^{-5}$/K) in a direction substantially parallel to a fiber arrangement direction and approximately 6 ($10^{-5}$/K) in a direction substantially orthogonal to the fiber arrangement direction).

The upper flange member 74 that structures the reel 10 is formed by injection molding of a material with a bending elastic modulus and linear expansion coefficient equal to the hub member with lower flange 72. Specifically, the upper flange member 74 is constituted with a fiber-reinforced plastic in which approximately 10% by weight of glass fibers serving as reinforcing fibers is mixed into a polycarbonate which is a thermoplastic resin of the similar type as the resin material that constitutes the hub member with lower flange 72, that is, basically the same material as the hub member with lower flange 72.

Figure 4:
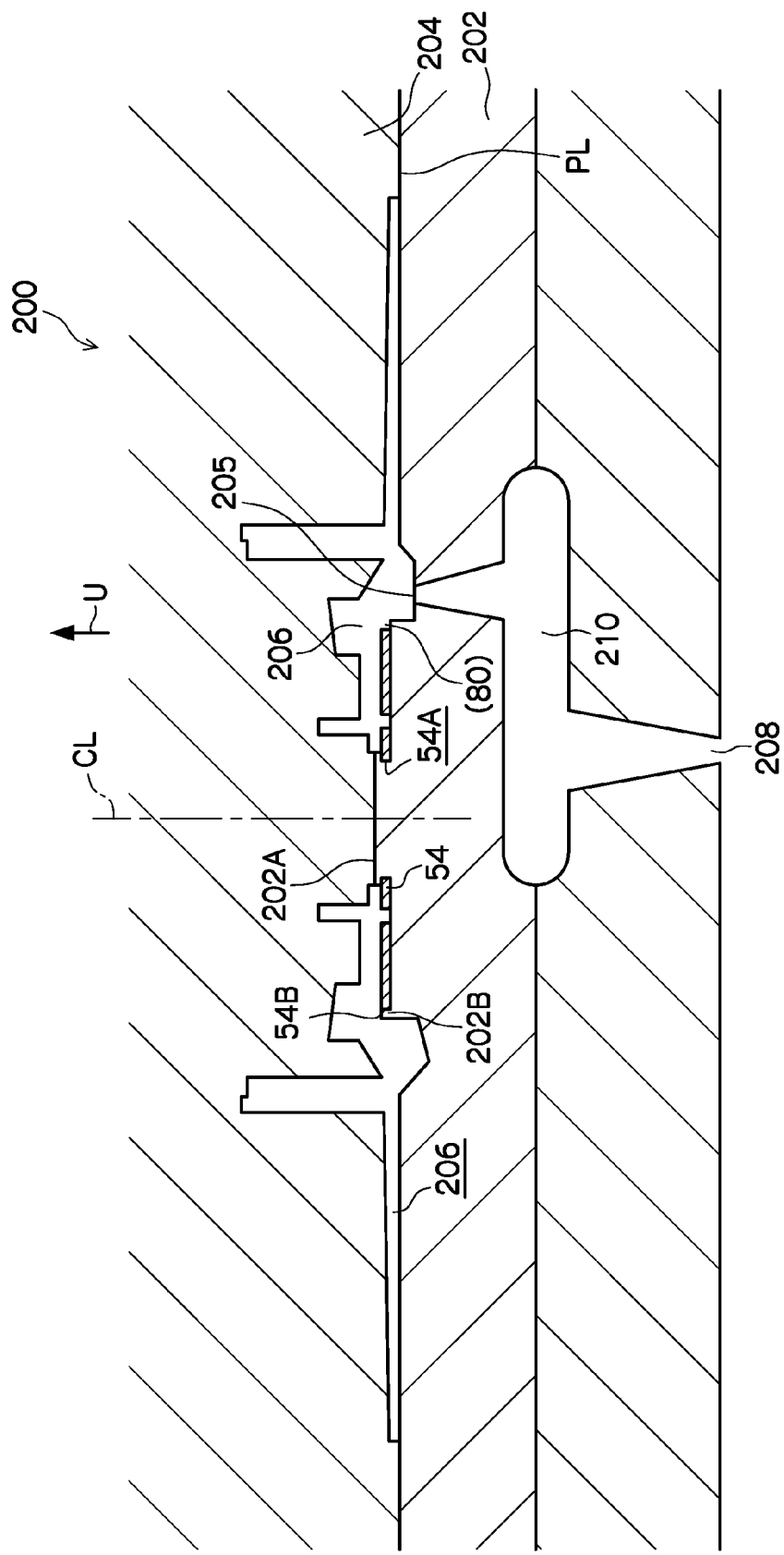
FIG. 4 is a sectional view showing a die structure for injection molding of a hub member with a lower flange that structures the reel relating to the first exemplary embodiment of the present invention.

When the above-described reel 10 is being fabricated, the hub member with lower flange 72 and the upper flange member 74 are formed respectively separately. The hub member with lower flange 72 is formed by injection molding using a die 200 as shown in FIG. 4. That is, the hub member with lower flange 72 is formed by the polycarbonate including glass fibers that is described above being charged into a cavity 206, which is a space formed by a fixed side die plate 202 and a movable side die plate 204.

In the reel 10 in which the pass-through hole 50 is formed at the axially central portion of the base portion 36 of the reel hub 32, gates 205, which are resin entry ports into the cavity 206, are set at portions at which, of the annular region of the base portion 36 at which the reel gear 42 is formed, the reel gear 42 is not formed for a portion in the circumferential direction. As illustrated in FIG. 2 as gate marks Gm1, which are marks of the gates 205, in this exemplary embodiment three of the gates 205 are set at equal intervals in the circumferential direction.

When supplied for the injection molding, the resin material, which is injected from an unillustrated injector, passes along a flow path (what are known as a sprue 208 and runners 210) formed in the fixed side die plate 202, passes through the three gates 205, and flows into the cavity 206 in which the reel plate 54 has been set. The interior of the cavity 206 is charged with resin and cooled, and after hardening due to cooling of the resin material, the die 200 is opened and the hub member with lower flange 72 is separated from the die 200. Thus, the hub member with lower flange 72 is formed, in which the reel hub 32 and the lower flange 38 are integrally formed and also the reel plate 54 is insert-molded.

Here, the reel plate 54 is positioned at the fixed side die plate 202 of the die 200 by an inner fitting portion 202A and an outer fitting portion 202B of the die 200. The inner fitting portion 202A fits into the through-hole 54A, and the outer fitting portion 202B touches the outer peripheral surface 54B at six locations in the circumferential direction. The outer fitting portion 202B of the fixed side die plate 202 is a structure that forms the groove portions 78, and forms the plate retention portions 80 between the portions of contact with the outer peripheral surface 54B of the reel plate 54 by the outer fitting portion 202B. FIG. 4 shows sectional views in which the two sides relative to a center line CL are different (with and without the outer fitting portion 202B). At this reel plate 54, plural step holes 54C (four in the present exemplary embodiment) are provided at equal intervals in the circumferential direction. The step holes 54C have a larger hole diameter at the lower side than at the upper side. The reel plate 54 is a structure that is retained at the hub member with lower flange 72 by resin that enters the step holes 54C and by the plate retention portions 80.

Figure 5:
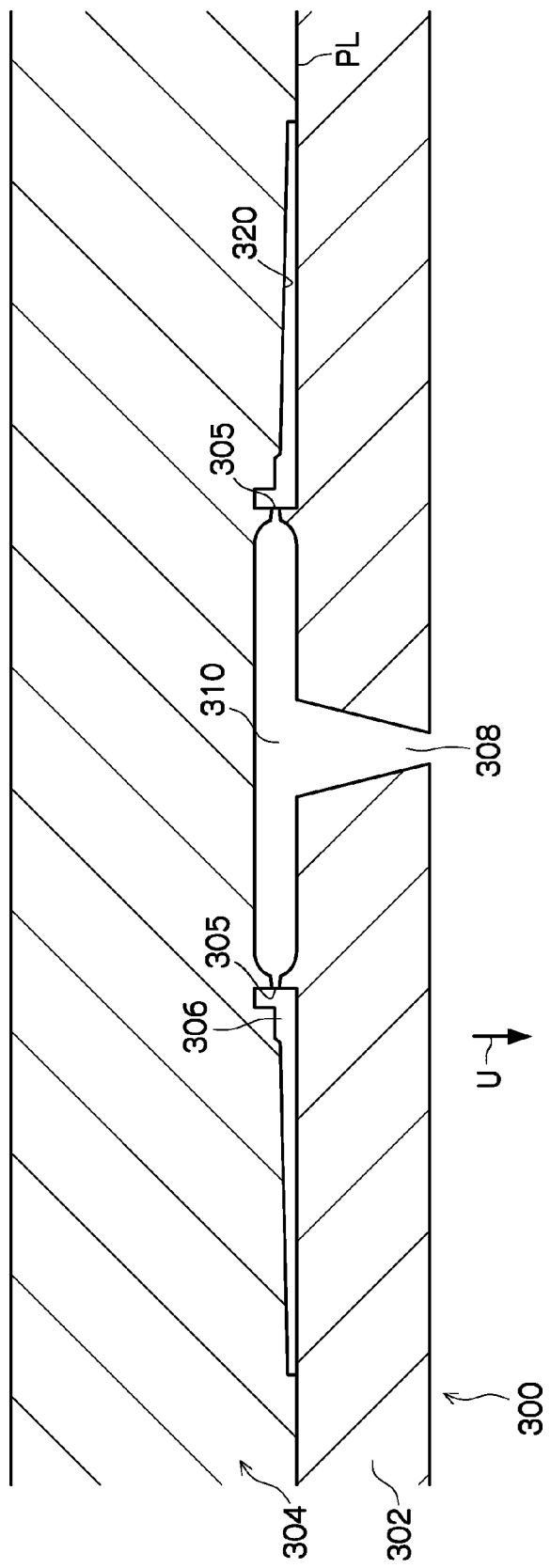
FIG. 5 is a sectional view showing a die structure for injection molding of an upper flange member that structures the reel relating to the first exemplary embodiment of the present invention.

The upper flange member 74 is formed by injection molding using a die 300 as shown in FIG. 5. That is, the upper flange member 74 is formed by the aforementioned polycarbonate including glass fibers being charged into a cavity 306, which is a space formed by a fixed side die plate 302 and a movable side die plate 304. Gates 305, which are resin entry ports into the cavity 306, are submarine gates and are plurally set at an inner periphery portion of the annular rib 76, at equal intervals in the circumferential direction.

Similarly to the case of the hub member with lower flange 72, the resin material injected from an unillustrated injector passes along a sprue 308 and runners 310 that branch in accordance with the gates 305, passes through the six gates 305, and flows into the cavity 306. The interior of the cavity 306 is charged with resin and cooled, and after hardening due to cooling of the resin material, the die 300 is opened and the upper flange member 74 is separated from the die 300. Thus, the upper flange member 74 is formed. As shown in FIG. 1, at the upper flange member 74, gate marks Gm2 of the gates 305 are located at the inner peripheral surface of the annular rib 76, facing to the radial direction inner side.

In a state in which the annular rib 76 is fitted into the cylindrical tube portion 34, an annular rib 76 radial direction outer side portion of this upper flange member 74 is ultrasonically welded to the upper end surface 34A of the cylindrical tube portion 34, and thus fabrication of the reel 10 is completed.

Next, operation of the first exemplary embodiment is described.

At the recording tape cartridge 11 having the above-described structure, as shown in FIG. 7, when the recording tape cartridge 11 is not in use, the braking member 55 is positioned at the rotation locking position and the braking gear portion 55B is meshed with the engaging gear 44, due to the urging force of the compression coil spring 58. Therefore, rotation of the reel 10 with respect to the case 12 is impeded. At this time, the reel gear 42 of the reel 10 is exposed from the gear opening 20, and the clutch main body 62 of the clutch member 60 is inserted through the pass-through hole 50 and looks out on the gear opening 20.

On the other hand, when the magnetic tape T is to be used, the recording tape cartridge 11 is loaded into the bucket (not shown) of a drive device along the direction of arrow A. Then, when the recording tape cartridge 11 is loaded to a predetermined depth in the bucket, the bucket is lowered, and the rotating shaft 100 of the drive device relatively approaches the gear opening 20 of the case 12 (moves upward) and holds the reel 10. Specifically, the rotating shaft 100 causes the driving gear 102 thereof to mesh with the reel gear 42, while attracting and holding the reel plate 54 by the magnet 104 in a non-contact state.

Accompanying the meshing-together of the reel gear 42 and the driving gear 102, i.e., the relative movement of the rotating shaft 100 with respect to the case 12 in the direction of approaching the case 12 along the axial direction, the axially central portion of the rotating shaft 100 abuts the clutch main body 62 of the clutch member 60, and pushes the clutch member 60 upward against the urging force of the compression coil spring 58. In this way, the braking member 55, which is abutting the clutch member 60, also moves upward, and the meshing-together of the braking gear portion 55B of the braking member 55 and the engaging gear 44 is cancelled.

Namely, the braking member 55 reaches the rotation permitting position relative to the reel 10. When the rotating shaft 100 moves further upward, the reel 10 is brought upward together with the clutch member 60 and the braking member 55 (with their relative positions remaining unchanged) against the urging force of the compression coil spring 58. At the recording tape cartridge 11, the braking member 55 thereby reaches the relative rotation permitting position (with respect to the case 12), and the lower flange 38 separates from the annular rib 22. In this way, as shown in FIG. 8, the reel 10 rises-up within the case 12, and becomes able to rotate in a state of not contacting the inner surfaces of the case 12. Further, although detailed description thereof is omitted, due to the bucket, i.e., the recording tape cartridge 11, being lowered within the drive device, the recording tape cartridge 11 is positioned in the horizontal direction and in the vertical direction with respect to the drive device.

Thus, while a pull-out pin (not shown) of the pull-out means of the drive device engages with the leader block 30, the pull-out means takes the leader block 30 out from the case 12 and guides the leader block 30 to the take-up reel of the drive device. Then, the leader block 30 is fit into the take-up reel and forms a portion of the take-up surface around which the magnetic tape T is taken-up. In this state, when the leader block 30 rotates integrally with the take-up reel, the magnetic tape T is pulled-out from the case 12 through the opening 18, while being taken-up onto the reel hub of the take-up reel.

At this time, the reel 10 of the recording tape cartridge 11 rotates synchronously with the take-up reel due to the rotational force of the rotating shaft 100 which is transmitted by the driving gear 102 which is meshed-together with the reel gear 42. Then, recording of information onto the magnetic tape T, or playback of information recorded on the magnetic tape T, is carried out by a recording/playback head that is disposed along a predetermined tape path of the drive device. At this time, the braking member 55 which cannot rotate with respect to the case 12 slidingly-contacts the clutch member 60 which rotates together with the reel 10 with respect to the case 12.

On the other hand, when the magnetic tape T is rewound onto the reel 10 and the leader block 30 is held in a vicinity of the opening 18 of the case 12, the bucket in which the recording tape cartridge 11 is loaded rises. Thus, the meshing-together of the reel gear 42 and the driving gear 102 is cancelled, the abutment of the rotating shaft 100 and the clutch member 60 is cancelled, and the clutch member 60 moves downward together with the braking member 55 (with the state of abutment thereof maintained) due to the urging force of the compression coil spring 58.

In this way, the respective stopper ribs 68 of the clutch member 60 abut the stopper surfaces 70A, and the braking gear portion 55B of the braking member 55 meshes with the engaging gear 44. Namely, the braking member 55 returns to the rotation locking position at which it impedes rotation of the reel 10 with respect to the case 12. Further, accompanying the operation of the braking member 55 and the clutch member 60 moving due to the urging force of the compression coil spring 58, the reel 10 also moves downward. While the lower flange 38 of the reel 10 is made to abut the annular rib 22, the reel gear 42 is returned to its initial state of being exposed from the gear opening 20. In this state, the recording tape cartridge 11 is ejected from the bucket.

Now, in the reel 10 relating to the exemplary embodiment of the present invention, the upper flange member 74 including the upper flange 40 is constituted of a material with an elastic modulus equal to the hub member with lower flange 72 including the reel hub 32. Therefore, the opening end of the reel hub 32 (the opposite side thereof from the base portion 36) is effectively reinforced by the upper flange member 74. Thus, with the reel 10, in the state in which the magnetic tape T is wound on the cylindrical tube portion 34 of the reel hub 32, deformation of the reel hub 32 is suppressed, particularly deformation to the radial direction inner side of the opening end (upper end) portion of the reel hub 32 that has relatively low stiffness within the body of the hub member with lower flange 72.

On the other hand, in the reel 10, the groove portions 78 are formed in the base portion 36 of the reel hub 32 at the periphery of the reel plate 54. Therefore, compared with a hub with a structure in which groove portions are not formed at the base portion, deformation of the base portion 36 side portion of the reel hub 32 toward the radial direction inner side in the state in which the magnetic tape T is wound on is expedited.

Thus, with the reel 10, the opening end portion of the reel hub 32 with relatively low stiffness is reinforced by the upper flange member 74, while the base portion 36 side portion with relatively high stiffness is expedited to deform (lowered in stiffness) by the groove portions 78. Therefore, in the state in which the magnetic tape T is wound round, the reel 10 deforms with good balance between the top and bottom in the axial direction of the reel hub 32. That is, with the present reel 10, a shape of the reel hub 32 after winding of the tape T is excellent.

Figure 6:
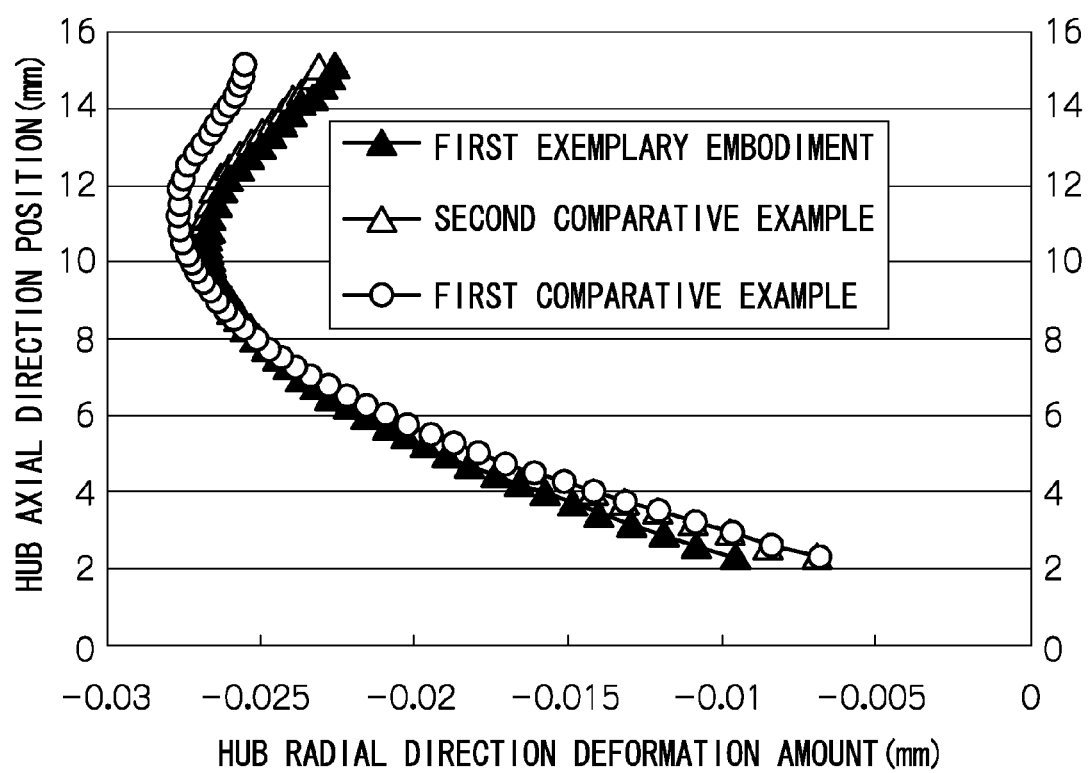
FIG. 6 is a graph illustrating shapes after tape winding of a reel hub outer peripheral surface structuring the reel relating to the first exemplary embodiment of the present invention.

In this regard, a first Comparative Example, which uses an upper flange member formed of a transparent polycarbonate (a polycarbonate which does not include glass fibers, with a bending elastic modulus of approximately 2300 MPa) instead of the upper flange member 74, for checking winding states of the magnetic tape T, and a second Comparative Example, which uses a hub member with a lower flange in which the groove portions 78 are not formed in the base portion 36 of the reel hub 32 and a upper flange member same as the upper flange member 74, are supplied and compared. The plot of solid black triangles shown in FIG. 6 represents hub shapes after tape winding (deformation amounts relative to radius, averaged over the circumferential direction) for the reel 10, the plot of white circles represents the same for the first Comparative Example, and the plot of white triangles represents the same for the second Comparative Example.

From this graph, it is apparent that, in the first Comparative Example, because the elastic modulus of the upper flange member is low, a reinforcement effect of the opening end portion of the reel hub 32 by the upper flange member is slight, and deformation amounts at the other end of the reel hub 32 (positions around 15 mm) are large. In contrast, in the reel 10, because of the reinforcement effect of the opening end portion of the reel hub 32 by the upper flange member 74 described above, deformation amounts at the upper end of the reel hub 32 are suppressed to be smaller by about 3 µm than in the first Comparative Example.

In the second Comparative Example, it is apparent that, because the upper flange member 74 is provided, deformation amounts of the upper end of the reel hub 32 are roughly equal to the same in the reel 10. However, because there are no groove portions 78, deformation amounts at the lower end side of the reel hub 32 are small, and a difference in deformation amounts between the upper and lower ends of the reel hub 32 is large. In contrast, in the reel 10, because of the deformation expediting effect caused by the groove portions 78 described above, deformation amounts at the lower end of the reel hub 32 are larger by about 3 µm than in the second Comparative Example.

From the above, with the reel 10 relating to the present exemplary embodiment and the recording tape cartridge 11 equipped with the reel 10, a difference between deformation amounts at the top and bottom of the reel hub 32 is small and, as described above, the shape of the reel hub 32 in the state in which the tape T has been wound on is excellent.

Further, in the reel 10, because the plate retention portions 80 are provided between the groove portions 78, the reel plate 54 is excellently retained at the base portion 36 of the reel hub 32. That is, because the plate retention portions 80 are provided, the reel plate 54 is retained from the outer peripheral surface 54B side thereof by contraction, inward in the radial direction, of the resin at the time of molding, and the reel plate 54 is unlikely to detach from the base portion 36 of the reel hub 32.

In the reel 10, because the six plate retention portions 80 (and groove portions 78), which is more than four, are provided in the circumferential direction, circularity is excellent in a plan view of the cylindrical tube portion 34 of the reel hub 32. In a Comparative Example in which, for example, the plate retention portions 80 are provided at only three locations with equal intervals in the circumferential direction, because of imbalances in contraction at the time of injection molding of the hub member with lower flange 72, the cylindrical tube portion 34 is likely to form a roughly triangular shape with corner portions at the positions of the plate retention portions 80. Hence, with the reel hub 32 at which the cylindrical tube portion 34 is in an approximately triangular shape, winding pressure of the magnetic tape T tend to concentrate at the three corner portions, which is to say the portions at which the plate retention portions 80 are formed, and the deformation expediting effect at the lower end of the reel hub 32 by the aforementioned groove portions 78 would be smaller. In contrast, in the reel 10, because at least four of the plate retention portions 80 are provided, circularity of the cylindrical tube portion 34 is improved relative to this Comparative Example, a winding pressure distribution of the magnetic tape T is made more uniform in the circumferential direction of the cylindrical tube portion 34, and therefore the deformation expediting effect by the groove portions 78 as described above is obtained.

Further, with the reel 10, because the linear expansion coefficient of the material structuring the upper flange member 74 is equal to the linear expansion coefficient of the material structuring the hub member with lower flange 72, degrees of expansion and contraction due to temperature changes are the same for the hub member with lower flange 72 and the upper flange member 74, and the reinforcement effect of the opening end portion of the reel hub 32 by the upper flange member 74 is obtained equally over a wide temperature range. That is, the reinforcement effect of the upper end surface 34A side of the cylindrical tube portion 34 by the upper flange member 74 is obtained at respective temperatures without the opening end portion of the reel hub 32 being deformed by deformations of the upper flange member 74 in accordance with the temperature.

Second Exemplary Embodiment

Figure 11:
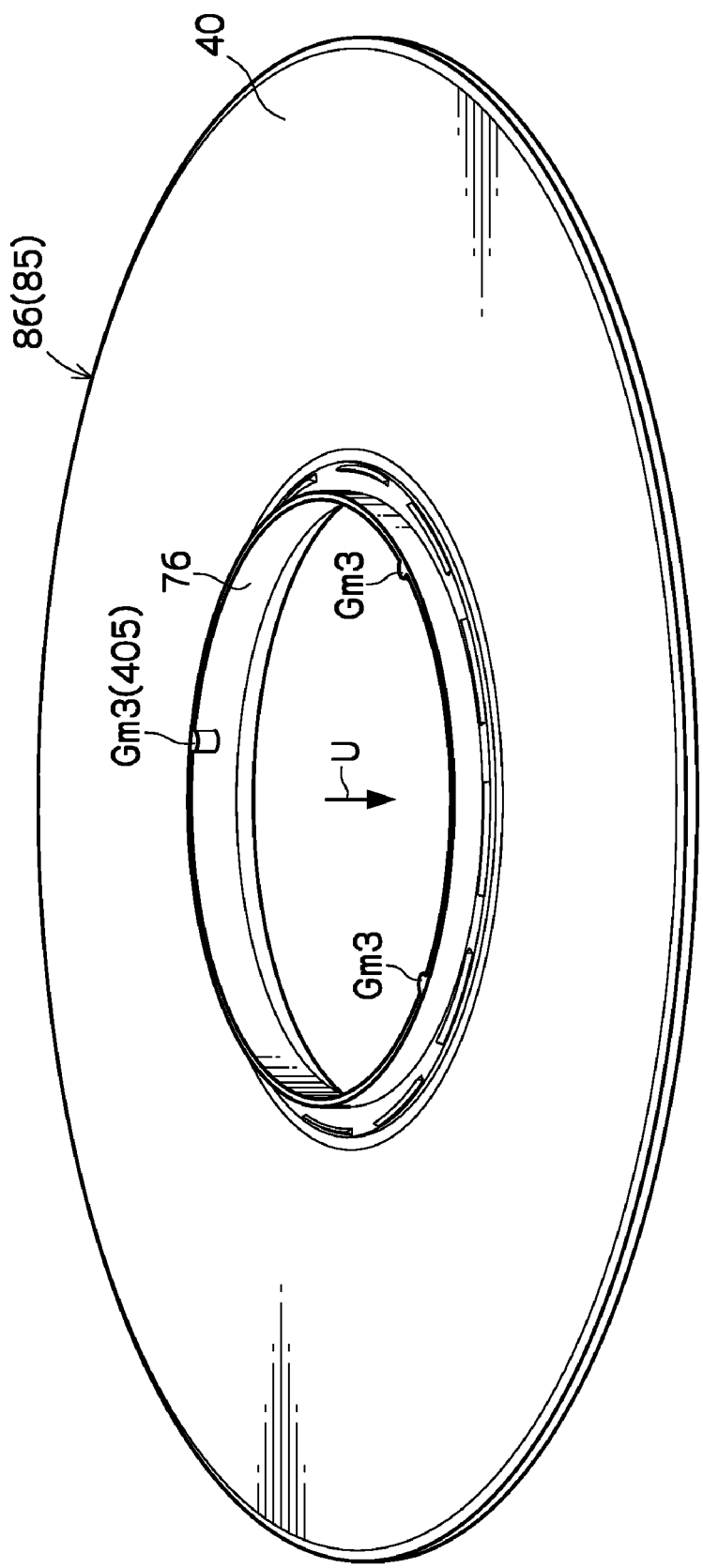
FIG. 11 is a perspective view of an upper flange member that structures a reel relating to a second exemplary embodiment of the present invention.

FIG. 11 shows an upper flange member 86 structuring a reel 85 relating to a second exemplary embodiment of the present invention, in a perspective view. As shown in FIG. 11, this differs from the reel 10 relating to the first exemplary embodiment in that, on the upper flange member 86, gate marks Gm3 from injection molding of the upper flange member 86 are disposed at the inner edge side of an axial direction end portion of the annular rib 76, facing in a direction substantially orthogonal to the flange surface of the upper flange 40, that is, the axial direction lower side of the upper flange 40.

Figure 12:
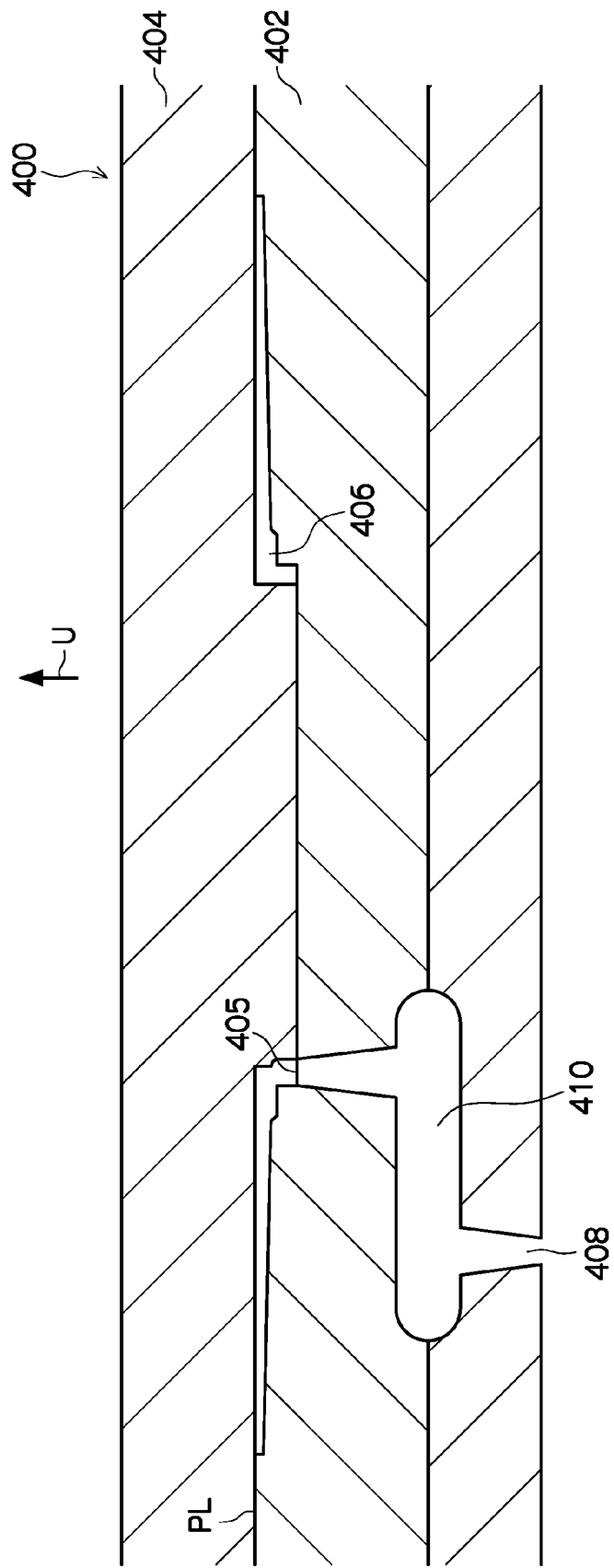
FIG. 12 is a sectional view showing a die structure for injection molding of the upper flange member that structures the reel relating to the second exemplary embodiment of the present invention.

This upper flange member 86 is formed by injection molding using a die 400 as illustrated in FIG. 12. That is, the upper flange member 86 is formed by the polycarbonate including glass fibers which is described above being charged into a cavity 406, which is a space formed by a fixed side die plate 402 and a movable side die plate 404. Gates 405, which are resin entry ports into the cavity 406, have pin gate structures, and are plurally set (three in this exemplary embodiment) at equal intervals in the circumferential direction, at the inner periphery side of an axial direction end portion of the annular rib 76 (the axial direction end portion at the opposite end thereof from the upper flange 40).

Similarly to the case of the hub member with lower flange 72, the resin material injected from an unillustrated injector passes along a sprue 408 and runners 410 that branch in accordance with the gates 405, passes through the three gates 405, and flows into the cavity 406. The interior of the cavity 406 is charged with resin and cooled, and after hardening due to cooling of the resin material, the die 400 is opened and the upper flange member 86 is separated from the die 400. Thus, the upper flange member 86 is formed.

The material constituting the upper flange member 86 has a higher bending elastic modulus than the bending elastic modulus of the material constituting the hub member with lower flange 72, while the linear expansion coefficient is smaller. Specifically, the upper flange member 86 is constituted of a material in which approximately 20 to 30% by weight of glass fibers is mixed into a polycarbonate of the similar type as the polycarbonate constituting the hub member with lower flange 72. In this exemplary embodiment, the material constituting the upper flange member 86 has a bending elastic modulus of approximately 6600 MPa (when 30% by weight of glass fibers is included) and a linear expansion coefficient of approximately 3 to 6 ($10^{-5}$/K) (approximately 3 ($10^{-5}$/K) in a direction substantially parallel to a fiber arrangement direction and approximately 6 ($10^{-5}$/K) in a direction substantially orthogonal to the fiber arrangement direction).

In the reel 85, which is provided with a flange member 82 with the constitution described above, because the elastic modulus of the material constituting the upper flange member 86 is higher than the elastic modulus of the material constituting the hub member with lower flange 72, the reinforcement effect at the opening end portion of the reel hub 32 due to the upper flange member 86 is higher. Therefore, at the plate retention portions 80, the shape of the reel hub 32 after winding of the magnetic tape T is even more excellent than the reel 10. Further, because the linear expansion coefficient of the material constituting the upper flange member 86 is lower than the linear expansion coefficient of the material constituting the hub member with lower flange 72, deformation of the reel hub 32 in association with temperature changes is restrained by the upper flange member 86. Therefore, deformation of the opening end portion of the reel hub 32 in association with temperature changes is effectively suppressed.

Further, at the plate retention portions 80, because the gate marks Gm3 of the upper flange member 86 face out in the axial direction of the upper flange 40, during injection molding using the die 400, resin may flow in through the gates 405 with a larger flow path cross-sectional area. Therefore, it is possible to assure flow characteristics when charging the polycarbonate including the 20 to 30 weight % glass fiber into the cavity 406. Thus, molding the upper flange member 86 (the upper flange 40) with a material having higher elastic modulus and lower linear expansion coefficient than the material constituting the hub member with lower flange 72 is realized.

The above exemplary embodiments illustrate an example in which the upper flange member 74 is joined to the hub member with lower flange 72 at which the lower flange 38 is formed integrally with the reel hub 32 (a "two-piece structure"), but the present invention is not limited to the same. For example, a structure in which the upper flange member 74 and (a member including) the lower flange 38 are joined to the reel hub 32 which has the form of a cylindrical tube with a base (a "three-piece structure") will suffice.

Moreover, although the above-described exemplary embodiments are configured such that the magnetic tape T is used as the recording tape, the present invention is not limited to the same. It suffices for the recording tape to be interpreted as an elongated-tape-shaped information recording/playback medium onto which information can be recorded and from which recorded information can be played-back. Needless to say, the recording tape cartridge can be applied as well to recording tapes of any recording/playback systems.

Moreover yet, the above-described exemplary embodiments illustrate an example in which a polycarbonate including glass fibers is employed as the materials constituting the reel hub 32 and the upper flange 40 (the lower flange 38). However the present invention is not limited to the same and various materials may be employed.

Further, the above-described exemplary embodiments illustrate an example in which the reel 10 is applied to the recording tape cartridge 11. However, the present invention is not limited to the same, and can be applied to recording tape cartridges that, for example, accommodate, within a case, two reels for drawing-out and taking-up. In this case, it suffices for the present invention to be applied to at least one of the reels. Further, the present invention can also be applied to the take-up reel of a drive device, or the like.

What is claimed is:

1. A reel comprising:
   a hub formed in the shape of a cylindrical tube with a base, on an outer peripheral surface of which a recording tape is wound;
   a base side flange portion that projects-out to a radial direction outer side of a base portion side of the hub;
   a flange member configured in a disc shape or an annular plate shape of a material with an elastic modulus at least equal to a material that constitutes the hub, the flange member being coaxially joined to an opening end portion of the hub;
   a metal plate formed in a circular plate shape or an annular plate shape, which is fixed coaxially to the base portion of the hub; and
   plate retention portions that are formed integrally with the base portion of the hub and touch an outer peripheral surface of the metal plate at at least four locations, which are at equal intervals in a circumferential direction of the hub.

2. The reel according to claim 1, wherein
   the material that constitutes the hub includes a thermoplastic resin, and
   the material that constitutes the flange member includes a thermoplastic resin, and a linear expansion coefficient of the material is equal to or less than a linear expansion coefficient of the material that constitutes the hub.

3. The reel according to claim 1, wherein
  the material that constitutes the hub includes reinforcing fibers in a thermoplastic resin, and
  the material that constitutes the flange member is a thermoplastic resin of the similar type as the thermoplastic resin that constitutes the hub, and the material includes reinforcing fibers in a proportion equal to or more than the material that constitutes the hub.

4. The reel according to claim 3, wherein the reinforcing fibers are included in the thermoplastic resin that constitutes the flange member in a proportion greater than the material that constitutes the hub.

5. The reel according to claim 1, wherein the flange member is formed by injection molding, and gate marks for injecting resin into a die are disposed at an inner edge side of the flange member and face in the axial direction.

6. A recording tape cartridge comprising:
  the reel of claim 1, the recording tape being wound on the outer periphery of the hub; and
  a case that rotatably accommodates the reel.

7. The reel according to claim 1, wherein spaces are provided between neighboring plate retention portions along the circumferential direction of the hub.

* * * * *